INVENTOR
JOHN S. LOVELL
BY
AGENT

Sept. 20, 1971  J. S. LOVELL  3,605,811
CONTROLLED IMPEDANCE DIVERTER VALVE
Filed Nov. 14, 1968  2 Sheets-Sheet 2
FIG. 4 *PRIOR ART*
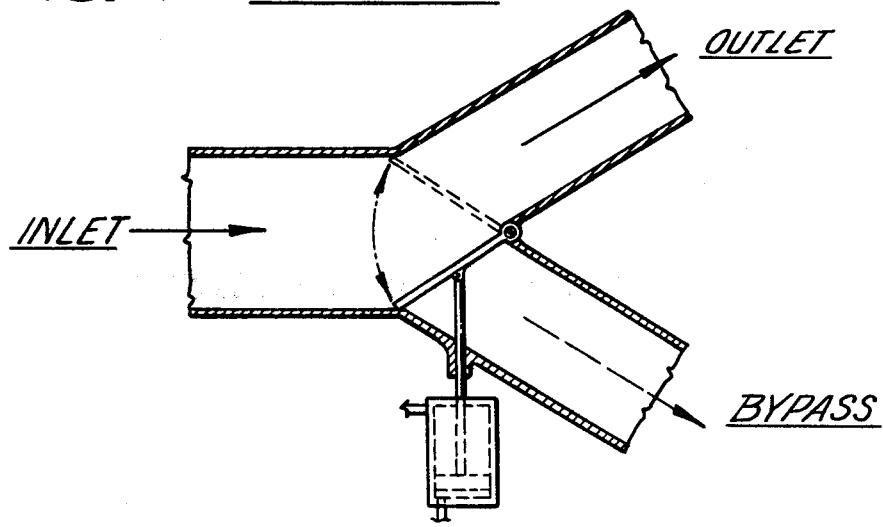
FIG. 5 *PRIOR ART*
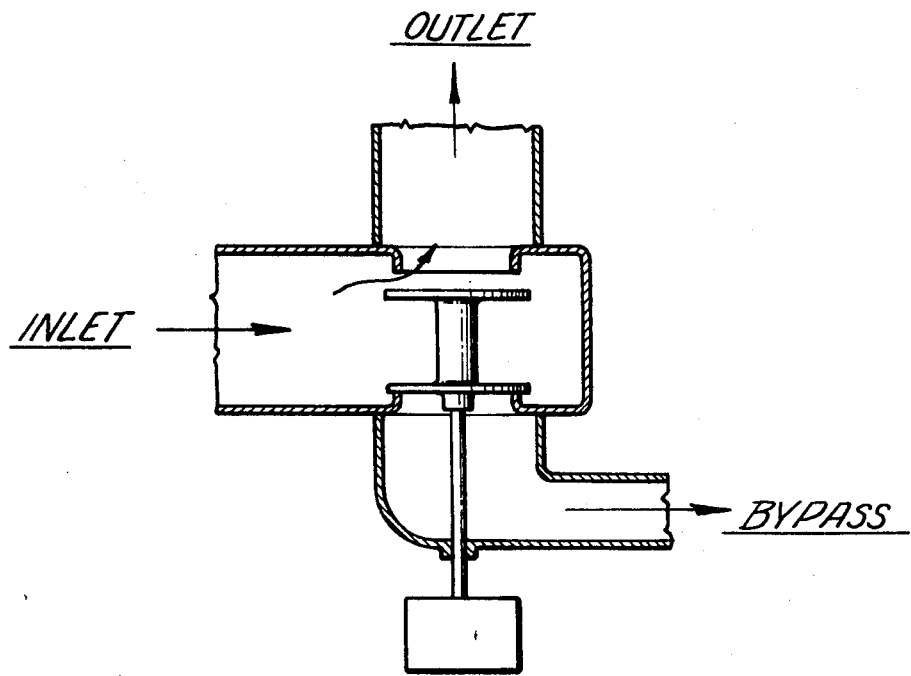
INVENTOR
JOHN S. LOVELL
BY Laurence A. Savage
AGENT United States Patent Office 3,605,811
Patented Sept. 20, 1971

3,605,811
CONTROLLED IMPEDANCE DIVERTER VALVE
John S. Lovell, Bloomfield, Conn., assignor to United
Aircraft Corporation, East Hartford, Conn.
Filed Nov. 14, 1968, Ser. No. 775,674
Int. Cl. F16k *11/14*
U.S. Cl. 137—625.49                      5 Claims

ABSTRACT OF THE DISCLOSURE

A controlled impedance diverter valve is provided by the combination of a poppet valve and a gate valve which requires small displacement to go from open to closed position.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

Field of the invention

This invention relates to diverter valves and particularly to controlled impedance diverter valves.

Description of the prior art

The diverter valve type well known in the art is the butterfly diverter valve which is shown in FIG. 4. This type valve has the disadvantages of poor sealing, the requirement of long actuator stroke and high force and the limitation that the impedance of only one flow path may be controlled at one time. Another type of diverter valve known in the art and used especially for liquid flow applications is the dual poppet type shown in FIG. 5. This type of diverter valve has a high pressure loss in both circuits. My valve does not have these drawbacks.

SUMMARY OF THE INVENTION

The object of the present invention is to provide a controlled impedance diverter valve for accurately proportioning a flow between two flow paths.

Another object of the present invention is to provide a flow regulating valve having low pressure drop characteristics and large area changes with small actuator movement.

In accordance with the present invention a controlled impedance diverter valve for regulating the flow of fluid in a duct is provided by the combination of gate valve means and poppet valve means in a single valve. The gate valve controls the flow through a main duct, while the poppet valve opens and closes a bypass around the duct. The diverter valve is disposed at the intersection of the main duct and the bypass duct. The gate valve means includes a stationary gate with at least one port therein; the poppet valve means normally closes the bypass and has operatively connected to it for movement therewith movable means for regulating the flow area of the stationary gate port. Actuator means are provided to position the poppet valve means. The movable means may comprise a movable gate with a port therein for registering with the port in the stationary gate, but it may also take other forms. In any event, the movable means includes means for regulating the flow area of the gate valve ports so that the desired flow area can be attained as a function of the position of the poppet valve means.

In further accord with the present invention it will be seen that the flow rate through the duct can be controlled by the shape of the ports in the gate portion and the degree to which the flow area of the ports in the stationary gate portion are open. In other words, the valve actuator may position the poppet so that the bypass is fully closed, fully open or any finite point in between, and, therefore, the flow through the gate valve in the duct will be an inverse function of the degree to which the bypass is open.

In still further accord with the present invention, the ports in the gate valve may be of an airfoil design for minimum pressure drop across the valve.

The foregoing and other objects, features and advantages of the present invention will become more apparent in light of the following detailed description of a preferred embodiment thereof, as illustrated in the accompanying drawings.

DESCRIPTION OF THE DRAWINGS

FIG. 4 is a schematic illustration of a butterfly type diverter valve known in the art.

FIG. 5 is a schematic illustration of a dual poppet type diverter valve known in the art.

DESCRIPTION OF THE PREFERRED EMBODIMENT

Figure 1:
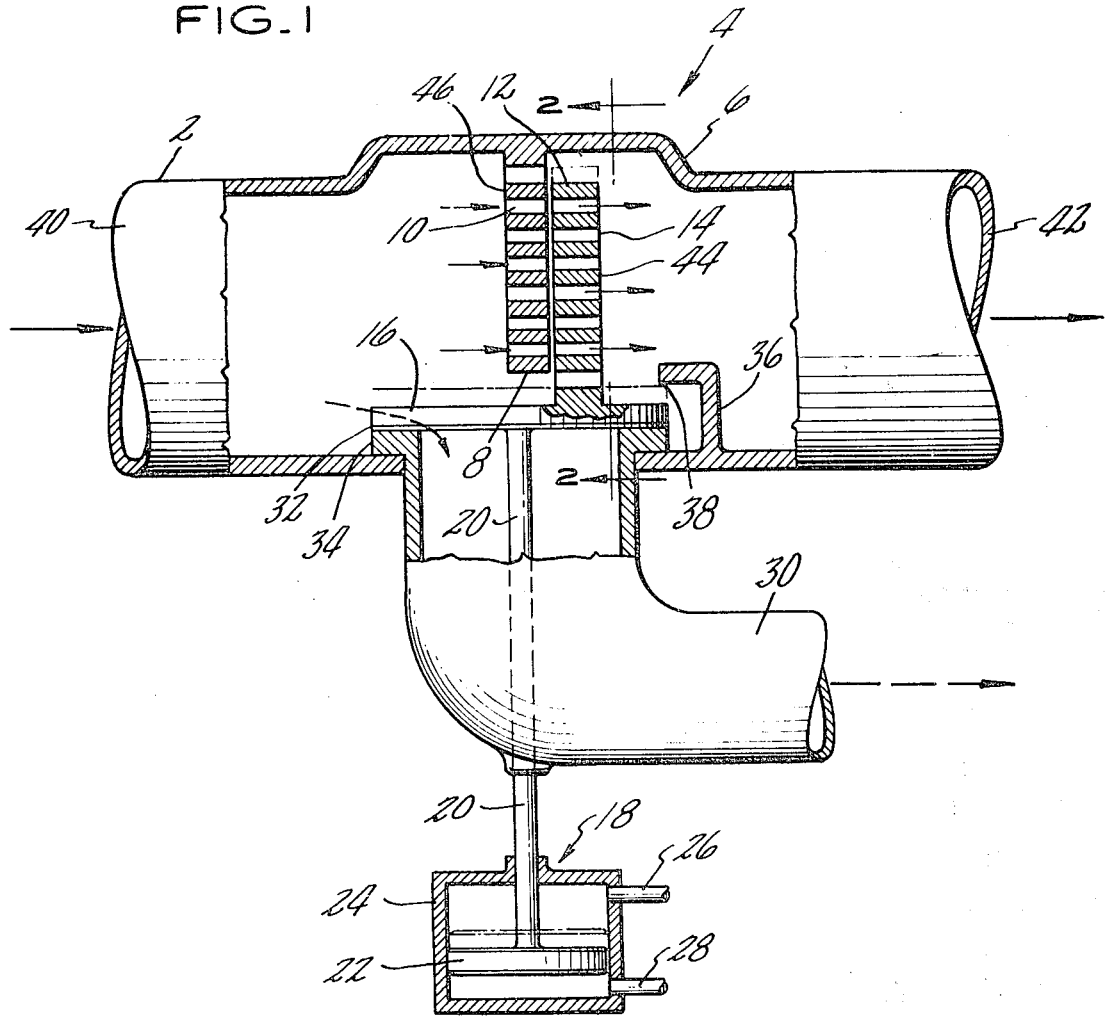
FIG. 1 is a schematic illustration of an exemplary embodiment of a controlled impedance diverter valve in accordance with the present invention.

Referring now to FIG. 1, there is shown a duct or pipe 2 having disposed therein a controlled impedance diverter valve in accordance with the present invention shown generally by the numeral 4. The valve 4 comprises a housing 6 in which is disposed a stationary gate 8 having ports 10 therein. A movable gate 12 having ports 14 therein is disposed on a poppet 16. The poppet is operatively connected to valve actuator means 18, for example, by means of a shaft 20. The actuator means 18 may be a piston-type actuator having a piston 22 translatable within a housing 24 and fluid ports 26 and 28. The actuator means could also be of the mechanical type, temperature responsive type or any of the many types of valve actuators well known in the art. A bypass 30 is connected to the duct 2, and the poppet 16 is adapted to close the bypass as shown in FIG. 1. Sealing means 32 is provided and is shown as the lower face of poppet 16 resting on a flange 34, but any other type of adaptable sealing means well known in the valve art could be used. A second sealing means 36 is provided to seal between the poppet 16 and sealing means 36 at surface 38 when the poppet valve is in a position where the bypass is open.

Figure 2:
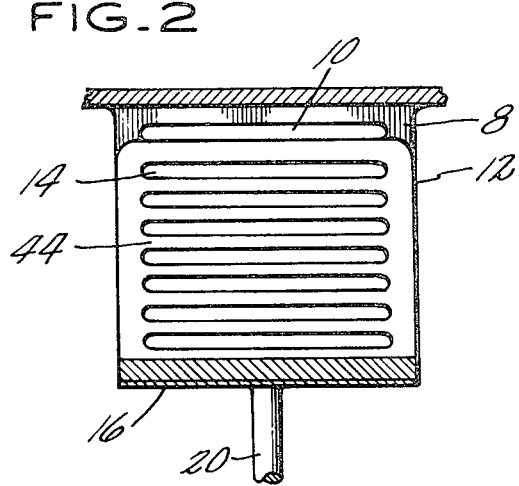
FIG. 2 is a section view taken along line 2—2 of FIG. 1.
Figure 3:
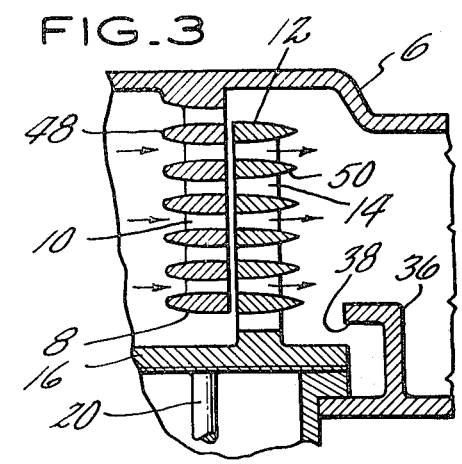
FIG. 3 is a schematic illustration of a gate valve having ports of airfoil design.

FIG. 2 shows the movable gate 12 mounted on the poppet 16, and shows a typical type of port 14 which may be utilized. FIG. 3 shows gate valve ports of airfoil design for very low pressure drop; the land portion 48 is like the leading edge of an airfoil, while the land 50 is shaped like the trailing edge of an airfoil.

In operation the poppet valve may be positioned to close the bypass completely as shown in FIG. 1; in this case the entire flow entering the inlet 40 of the duct 2 will flow through the duct to the outlet 42 of the duct 2. If it is desired to close off duct 2 completely the actuator may position the poppet 16 as shown by the phantom lines in FIG. 1 whereby the ports 10 of the stationary gate 8 will be blocked by the solid lands 44 of the movable gate 12, and the ports 14 of the movable gate 12 will be blocked by the solid lands 46 of the stationary gate 8. If the poppet 16 is positioned as shown by the phantom lines in FIG. 1, the flow through the duct 2 will be blocked completely and the flow entering the inlet 40 of the duct 2 will flow through the opening between the poppet 16 and the flange 34 into the bypass 30. Of course, it will be obvious to anyone skilled in the art that the poppet 16 may be positioned by the actuator 18 at any finite position between the fully closed position and the fully opened position, and, therefore, the flow rate through the duct 2 may be regulated merely by positioning the poppet 16 as desired.

It will also be obvious to one skilled in the art that the ports in the gate valve can be contoured to give any desired flow area versus position relationship.

There has thus been described a preferred embodiment of a controlled impedance diverter valve in accordance with the present invention. It should be understood by those skilled in the art that while I have shown specific mechanisms in order to describe a preferred embodiment of my invention, various valve actuators, sealing means, port shapes, and arrangements may be substituted for those shown in the preferred embodiment without departing from the spirit and scope of the invention, which is to be limited only as set forth in the following claims.

What I claim as new and desire to secure by Letters Patent of the United States is:

1. A controlled impedance diverter valve for regulating the flow of fluid through a duct having a straight portion and capable of diverting the flow to a bypass, the valve being disposed at the intersection of the duct at the straight portion and the bypass, comprising:
   a valve housing;
   gate valve means disposed in said valve housing including a stationary gate having a plurality of elongated slots formed therein for regulating flow through the duct such that the flow through the gate is in axial alignment with the straight portion of the duct;
   said gate valve means also having a movable gate having a plurality of elongated slots coextensive with and equal in number to the slots in the stationary gate;
   normally closed poppet valve means disposed in said valve housing and adapted to open said bypass;
   actuator means for positioning said poppet valve means solely rectilinearly; and
   said movable gate disposed in said valve housing juxtaposed to said stationary gate and adapted to regulate the flow area of said slots of said stationary gate with minimum relative movement, said movable gate being operatively connected to said poppet valve means for solely rectilinear movement therewith.

2. A controlled impedance diverter valve for regulating the flow of fluid through a duct having a straight portion and capable of diverting the flow to a bypass, the valve being disposed at the intersection of the duct at the straight portion and the bypass, comprising:
   a valve housing;
   a gate valve disposed in said housing having a stationary gate with a plurality of elongated slots formed therein and a movable gate with a complementary number and sized slots formed therein, said slots of said stationary gate and said movable gate normally being in registry for passing fluid straight through without any substantial pressure losses;
   normally closed poppet valve means for opening the bypass, including means for moving said slots out of registry in response to minimal movement of said poppet valve means; and
   actuating means for positioning said poppet valve means solely rectilinearly.

3. A controlled impedance diverter valve for regulating the flow of fluid through a duct having a straight portion and capable of diverting the flow to a bypass, the valve being disposed at the intersection of the duct and the bypass, comprising:
   a valve housing;
   a stationary gate mounted in said straight portion having a plurality of transverse slots formed therein and disposed in said housing;
   a poppet disposed in said housing normally closing said bypass;
   a movable gate movable solely rectilinearly having a complementary number and sized slots to the slots of said stationary gate formed therein and disposed on said poppet for movement therewith such that the slots of said movable gate are in registry with the slots of said stationary gate when said poppet is positioned to close the bypass, said slots of said movable gate moving out of registry with said slots in said stationary gate as said poppet is positioned to open the bypass; and
   actuator means for positioning said poppet.

4. A diverter valve for a passageway having a straight-through portion, a gate valve having a fixed element extending transversely in said passageway disposed intermediate the ends of said straight-through portion, said gate valve also having a movable element disposed in juxtaposed position with said fixed element, said fixed element and said movable element each having a plurality of elongated slots formed parallel to the axis of flow in said passageway, in combination with a poppet valve controlling the area of an opening formed in said passageway adjacent said movable element to divert the flow from said passageway to bypass the openings in said fixed and movable elements, said movable element being ganged to said poppet valve to be moved therewith and means for imparting solely rectilinear movement to said poppet valve to open and close said opening formed in said passageway and concomitantly place said elongated slots in said fixed and movable elements in and out of register with respect to each other with a minimum of relative movement.

5. A diverter valve as claimed in claim 4 wherein a valve seat surrounding said opening in said passageway cooperates with said poppet valve, said poppet valve includes a valve disc having a surface in said passageway, and said movable element is mounted on said surface.

References Cited

UNITED STATES PATENTS

| 579,114 | 3/1897 | Libbey | 137—625.26 |
| 621,928 | 3/1899 | Libbey | 137—625.26 |
| 3,236,253 | 2/1966 | Symmons | 137—610X |

ARNOLD ROSENTHAL, Primary Examiner

U.S. Cl. X.R.

137—610